United States Patent [19]

Dailey et al.

[11] 3,760,368

[45] Sept. 18, 1973

[54] VECTOR INFORMATION SHIFTING ARRAY

[75] Inventors: Jack R. Dailey, Apalachin; Harry C. Kuntzleman, Newark Valley; George E. Mitchell, Endicott, all of N.Y.

[73] Assignee: International Business Machines Corporation, Armonk, N.Y.

[22] Filed: Apr. 21, 1972

[21] Appl. No.: 246,313

[52] U.S. Cl. .......................... 340/172.5, 340/173 AM

[51] Int. Cl. .......................... G11c 15/00

[58] Field of Search .......................... 340/173.1, 173 AM, 340/174 SR, 174 ZA, 174.1, 172.5

[56] References Cited

UNITED STATES PATENTS

| | | | |
|---|---|---|---|
| 3,475,733 | 10/1969 | Gaines et al. | 340/173 |
| 3,535,694 | 10/1970 | Anacker et al. | 340/172.5 |
| 3,543,247 | 11/1970 | Schrem | 340/172.5 |
| 3,560,940 | 2/1971 | Gaensslen | 340/173 |
| 3,593,317 | 7/1971 | Fleisher et al. | 340/172.5 |
| 3,594,731 | 7/1971 | Bernstein | 340/172.5 |
| 3,596,251 | 7/1971 | Buchan et al. | 340/172.5 |
| 3,611,309 | 10/1971 | Zingg | 340/172.5 |
| 3,646,526 | 2/1972 | Fagan et al. | 340/173 R |

*Primary Examiner*—Paul J. Henon
*Assistant Examiner*—James D. Thomas
*Attorney*—J. Jancin, Jr. et al.

[57] ABSTRACT

A content addressable storage array (sometimes referred to as an associative array or a functional array) having a plurality of data storage cells which allows data in one cell word group to be transferred to adjacent cell word groups or alternatively shifted left or right. This is accomplished without the data exiting the array by utilizing transfer gates between the cells which provide for the temporary storage of data during transfer operations.

6 Claims, 3 Drawing Figures

VECTOR INFORMATION SHIFTING ARRAY

BACKGROUND OF THE INVENTION

This invention relates to information storage systems and more particularly to associative storage arrays which allow the shifting of data within the array.

The prior art associative memory arrays which allow a certain degree of shifting of data within the array have been known. These systems have generally been limited to allowing only one source of information to be active at any one time while the system is in the read out mode. This was because when the system is in the read out mode the pattern being read out must appear on a line common to all the word cells which have been energized by a common read signal. Additionally, these systems require that the cells which are to receive this shifted data must have been erased or reset in order to prevent these cells from reading out other information onto the common data lines. Utilizing these prior art systems, therefore, if one desired to transfer multiple words, it was required that the transfers be made sequentially.

Other systems that do provide for simultaneous transfer or shifting of multiple words do not utilize common lines and require that the data be outputted from the array during the shifting operation and then be reinserted into the new location within the array. These systems require that for a shifting operation, for example, one column to the left or right, that the word to be moved be read out of the array to an external mechanism (an input/output register means) where the columnar relationship is changed. A subsequent store operation is then performed to enter the word with the required column shift.

It is an object of this invention to permit the multiple directional shifting of data within a memory array without the necessity of reading out the information to an external storage register.

It is another object of this invention to allow the simultaneous transfer of a number of words from one storage location to another without having to clear or reset the data locations into which data is being stored.

It is a still further object of this invention to permit the simultaneous transfer of any number of words from any storage location to another storage location containing different information from that contained in the other locations being simultaneously shifted.

It is a still further object of this invention to provide for the transient storage of data in a transfer gate internal to the shift array during the shifting operation in order to insure that the data originally stored in a location subsequent to the shifting operation is not destroyed.

It is a further object of this invention to shift the data within the storage array with respect to its columnar relationship.

SUMMARY OF THE INVENTION

These and other objects of the invention are accomplished in the following manner. Each cell of the memory array of the present invention has connected to it and to each of its adjacent cells a data transfer gate which routes stored information to the adjacent memory cells in a two phase operating mode. The stored state of the cell appears at the input of each of the transfer gates connected to that cell upon receipt of a shift in pulse. In this manner the stored state of the cell is locked into the transfer gate. Upon receipt of a shift out pulse on the transfer gate of the adjacent cell to which the stored data is to be transferred the stored state is transferred to the selected memory cell.

The transfer gate is utilized in the array configuration to transfer data words between adjacent memory cells in any desired direction. Control signal lines are utilized to direct the data shifting.

DESCRIPTION

Figure 1:
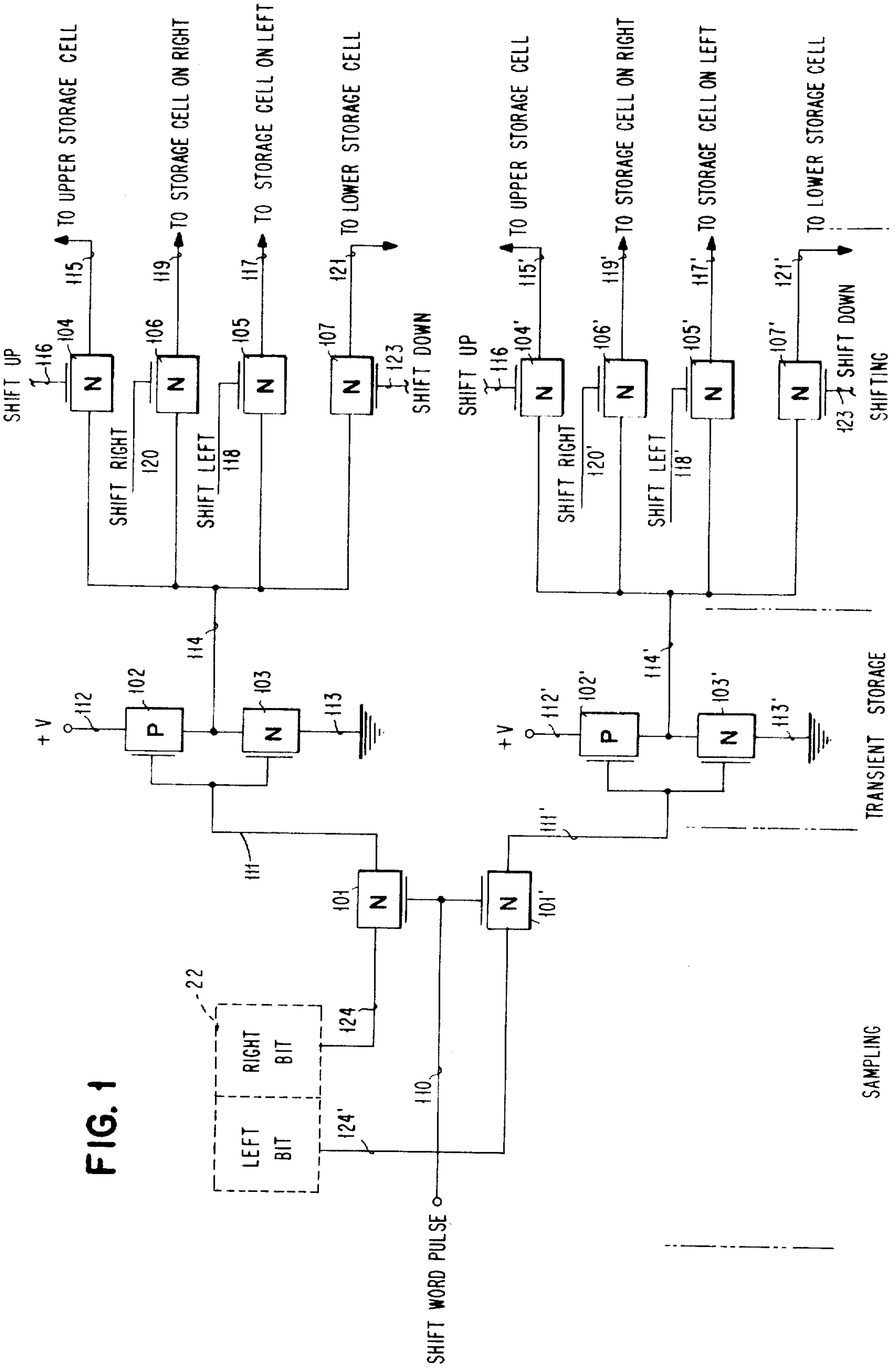
FIG. 1 shows a schematic diagram of the transfer gate that is utilized in the present invention.

Referring now to FIG. 1, the transfer gate that is utilized by the shifting array of the invention will be described. Each of the transfer gates are associated with each of the functional storage cells 22 that comprise the array. The functional storage cells 22 which will be utilized to describe the present invention is assumed to be of the type that is divided into two halfs. One half containing a left bit and the second half containing a right bit. It will be clear to one skilled in the art that the invention is not limited to this type of functional storage cell 22 and that many types of storage cells may be utilized.

As shown in FIG. 1, the transfer gate may be viewed as being divided into three stages. The first stage comprising FET 101 and 101' comprising a sampling stage for sampling the signal contained within the functional storage cell 22. FET 102, 103 and FET 102', 103' comprise the transient storage stage for temporarily storing the contents of the function storage cell 22 during the transfer operation. The third stage comprising FET 104, 105, 106, 107 and FET 104', 105', 106' and 107' controls the direction of the shifting operation.

Connected to each half of the functional storage cell 22 is the drain of FET 101 and 101'. As shown in FIG. 1 FET 101 is connected to the right bit of the functional storage cell 22 while FET 101' is connected to the left bit of the functional storage cell 22. FET 101 and 101' allow the right bit and left bit, respectively, of functional storage cell 22 to be sampled upon demand. The gate of FET 101 and 101' are connected to the shift word pulse line 110 which controls the sampling operations of FET 101 and 101'. The source of FET 101 and 101' are connected to the gate of FET 102, 103 and 102', 103', respectively, by lines 111 and 111'. FET 102, 103 and 102' and 103' provide for the means to transfer the bits that were sampled from the functional storage cell 22 to the shifting gates to be described below while also providing a means to temporarily store this data during the transfer operation. The source elements of FET 102 and 102' are connected to a bias voltage V by lines 112 and 112', respectively, while the source elements of FET 103 and 103' are connected to ground by line 113, 113', respectively.

The two pairs of FET transient storage elements are connected to the shifting stage by lines 114 and 114'. Line 114 connects the drain of FET 102 and the drain of FET 103 to the drain of each of the shifting FETs 104, 105, 106 and 107. In a similar manner, line 114' connects the drain of FET 102' and the drain of FET 103' to the FET shifting group comprising FETs 104' and 105', 106' and 107'. As is shown in FIG. 1, line 114 connects to the drain of FET 104 which provides for the shifting of the data samples from the right bit half of the functional storage cell 22 to the storage cell above storage cell 22. This shifting to the upper storage cell over line 115 is controlled by the shift up line 116 which is connected to the gate of FET 104. Line 114 is also connected to the drain of FET 105 which controls the shifting of the data samples from the right bit of the functional storage cell 22 to the storage cell to the left of functional storage cell 22 over line 117. The shifting of the data to the left is controlled by shift left line 118 which is connected to the gate of FET 105. Line 114 is similarly connected to the drain of FET 106 which controls the shifting of the data samples from the right bit of the functional storage cell 22 to the functional storage cell to the right over line 119 which is connected to the source of FET 106. The shifting to the right is controlled by shift right line 120 which is connected to the gate of FET 106. Line 114 is also connected to the drain of FET 107 which controls the shifting of the data samples from the right bit half of the functional storage cell 22 to the functional storage cell below functional storage cell 22, over line 121 which is connected to the source of FET 107. The shifting to a lower storage cell is controlled by shift down line 123 which is connected to the gate of FET 107.

In a manner similar to that described above for the data samples from the right bit half of the functional storage cell 22 line 114' is connected to FET 104', 105' and 106' and 107' which controls the transfer of data to the upper, left, right and lower storage cells, respectively, for the data sampled from the left bit half of the functional storage cell 22. The shift up line 116, shift left line 118, shift right line 120, and the shift down line 123 are the same lines that were described above for the right bit elements. The memory array of FIGS. 2A and 2B can be any one of several types known in the art, for example that shown in U.S. Pat. No. 3,609,702 issued Sept. 28, 1971, to P. A. E. Gardner et al. Said patent shows a functional memory having four-state transistor cells arranged in a plurality of word groups. Primary triggers (corresponding to the latches 201, 202, 203 of the present application, described below) are provided for each word group. The triggers are set during the early part of word select cycles and each trigger is reset by its word group cells later in the select cycle unless a match occurs between its search data and an input search argument. During read and write cycles, the word groups read from or written into are those with primary triggers which remain set from a preceding select cycle as a result of a match condition. During read and write cycles, data is transferred between selected word groups and input/output registers by way of common data bit lines.

Referring now to FIG. 2 the memory array which utilizes the transfer gate of FIG. 1 will be described. FIG. 2 shows a three-by-three array of functional memory cells designated functional memory cells 11, 12, 13, 21, 22, 23, 31, 32 and 33 arranged in word groups of cells 11, 12, 13 of cells 21, 22, 23 and of cells 31, 32, 33. Each of these functional memory cells has associated with it a transfer gate such as that shown in FIG. 1 thus providing a transfer gate word group for each cell word group. For clarity, only that transfer gate that is associated with the functional memory cell 22 has been shown in detail.

The common shift input line 204 is connected to the source FET 210, 211, and 212. The common shift input line 204 provides the shift in signal to the array when a shifting operation is required. FETs 210, 211 and 212 control the transfer of the shift in pulse to the appropriate word pulse line 110 which is connected to the drain of each of these FETs. Each line 110 is connected to all transfer gates of a respective word group. Latch 201, 202 and 203 have outputs connected to the gates of FETs 210, 211 and 212, respectively, and control the selection of the appropriate word group that is to be shifted. That is, if data in the word group cells 21, 22, 23 is to be shifted latch 202 is set during a select cycle as described above with respect to the Gardner et al patent. When latch 202 is set, it applies a signal to the gate of FET 211 to switch the FET to its low impedance state. The shift signal is applied to line 204 and is gated from line 204 through FET 211 onto the word pulse line 110 of transfer gates associated with cells 21, 22, 23. The word pulse line 110 is duplicated for each word group and each is connected to the transfer gate of FIG. 1 which is associated with each functional memory cell of a respective line of the array.

Figure 2A:
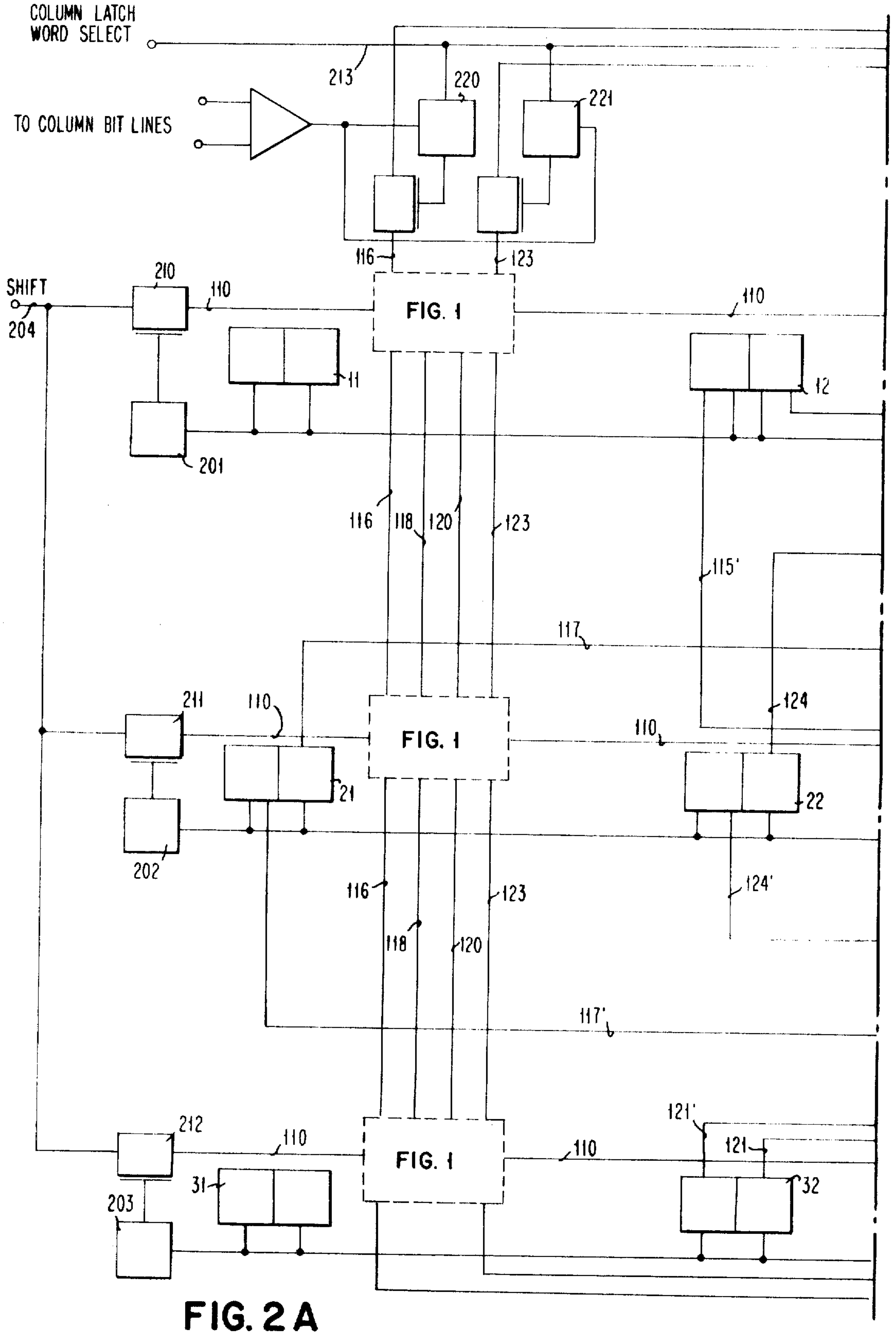
FIG. 2 shows a schematic diagram of the memory array utilizing the transfer gate of FIG. 1.
Figure 2B:
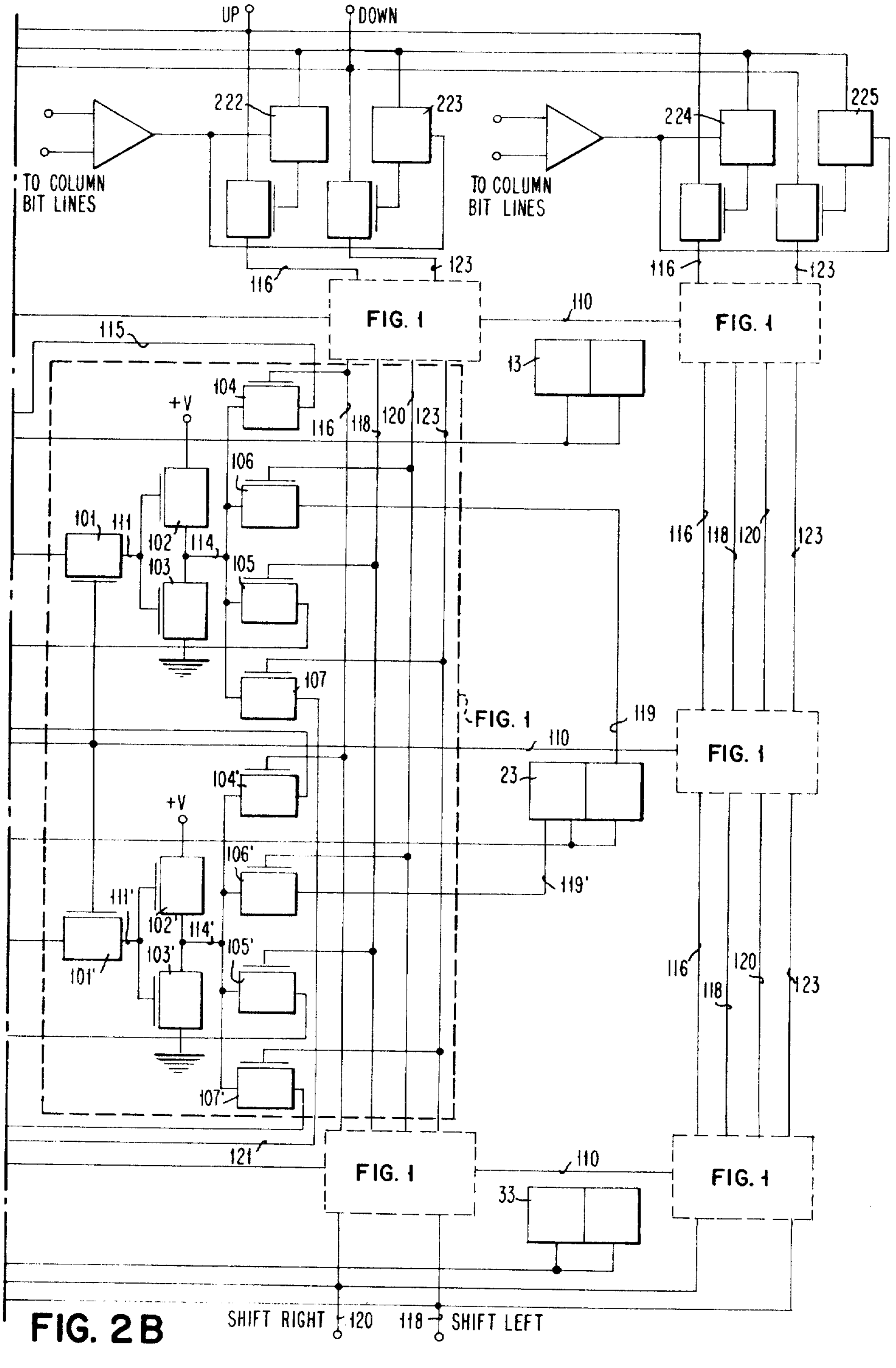

The shift up line 116, the shift down line 123, the shift left line 118 and the shift right line 120 are shown in FIGS. 2A, 2B connected to all the transfer gates of the array and perform the up, down, left and right shift operations, respectively, as described above in the description of FIG. 1.

In addition to the inputs described above a column word shift-up, down option may also be included in the array. The column latch word select line 213 is connected to the column select latches 220, 221, 222, 223, 224 and 225. The column latches provide column word selection in a manner similar to the standard word or row selection as shown and described above for latch 201, 202 and 203. More particularly, latches 220, 222 and 224 connect the column word shift-up line UP to the shift-up line 116 when they are set. When a pulse is applied to column latch word select line 213, it sets latches 220, 222 and 224. In their set state, latches 220, 222 and 224 turn on corresponding FETs which couple the line UP to lines 116. Similarly, latches 221, 223 and 225 couple the column shift-down line DOWN to shift-down lines 123 via associated FETs when a pulse is applied to the column latch word select line 213.

When only part of the columns of the word groups are to be shifted up or down, logic connected to each latch pair 220, 221 or 222, 223 or 224, 225 selects the desired columns.

Referring now to FIG. 2 the column shift up or down option for a full word will be described. The common column latch word select line 213 is connected to column latches 220, 221, 222, 223, 224 and 225 causing them to be set. The common shift input up line UP or line DOWN provides the "shift in" signal to the array when an up or down word shift is required, via the respective FET's and lines 116 and 123 which control the transfer of the shift pulses to the appropriate word lines related to latches 201, 202 and 203. Latches 201, 202 and 203 are connected to the gates of FETs 210, 211 and 212 respectively and control the selection of the appropriate word line (or lines) that is to be shifted up or down. That is, of the word line 2 of the array is to be shifted, latch 202 is set as described above, thereby allowing the shift in signal to be gated from line 204 through FET 211 onto the word pulse line 110 associated with cells 21, 22, 23.

For a word shift up, the shift line 116 is energized under control of the column latch selector line 213 and the latches 220, 222, and 224 and the up shift control line as described above. The word information contained in the cells of the word row represented by latch 202 is shifted up to the cells in word row represented by latch 201. A similar operation describes shift down from 202 row to 203 row if the appropriate controls are exercised.

OPERATION

Referring now to FIG. 1 the operation of the transfer gate will be described. The data from the right bit and the left bit of the functional storage cell 22 is always present at the source of FETs 101 and 101' respectively, over lines 124 and 124'. When a shift in pulse appears on shift word pulse line 110 it appears on the gate elements of FET 101 and 101'. This transfers the level that is previously on line 124 and 124', to lines 111 and 111', respectively. When the shift in pulse terminates the FETs 101 and 101' are turned off isolating the level sampled from the functional storage cell 22 on lines 111 and 111'. This level on lines 111 and 111' turns on either FET 102 or 103 and FET 102' or 103', respectively, transferring the level to line 114 and 114'. When a shift out pulse is received over any of the shift out lines the pulse appears on the gate element of its associated FET and the level on line 114 is shifted out of the transfer gate to the storage cell associated with the shift out FET. For example, if the data were to be shifted left a shift out pulse would be transmitted over shift left line 118 which is connected to the gate of FET 105 and 105'. This pulse would turn on FET 105 and 105' and transfer the level present on line 114 and 114' to the right half and the left half, respectively, of the functional storage cell to the left of the functional storage cell 22 over lines 117 and 117'. In a similar manner the data could be shifted up, to the right or down. It will be clear to those skilled in the art that the data could be simultaneously transferred in several directions by simply transmitting shift out pulses over a plurality of the shift lines.

Referring now to FIG. 2 the operation of the array will be described. In normal operation of the array shifting of a selected row or rows will be determined by selection of latches 201, 202 or 203. The operation will be described assuming that only select latch 202 has been set calling for a right shift of one position of the word associated with the row of select latch 202. In this case, the shift in signal would be generated over common shift input line 204 and gated under the control of select latch 202 thru FET 211 to word pulse line 110 which is common to cells 21, 22 and 23. This shift signal would enable gates 101 and 101' to cell 22 (and similarly the transfer gates not shown for a cell 21 and 23) allowing the data in each half of storage cell 22 to be transferred via lines 124, 124' and gates 101, 101' to line 111 and 111' where it may activate the gates of FET 102 and 103 and 102' and 103', respectively, as described above for FIG. 1. The right shift signal would then be transmitted over right shift line 120 at shift out phase time. Without utilizing the column select option which will be described below, all right shift output gates, that is FET 106 and 106' in each transfer gate would receive this pulse but only the information of the selected word would be transferred by the right shift output gates 106 and 106' to the memory cell to the right over lines 119 and 119'. That is, the the information in memory cell 21 would be transferred at shift out time to cell 22, the information in cell 22 simultaneously would be shifted to cell 23 and through connections not shown if cell 23 was a right most cell in the word, such as in the three-by-three array of FIG. 2, its contents could be end around shifted back into cell 21. This would permit the horizontal rolling of information within this word. It will be clear to those skilled in the art that a similar procedure, with the selection of shift and any of the other directional inputs energized at the proper time, could shift the information in the cells of this word to the left or up or down in a parallel fashion.

It will also be clear to those skilled in the art that by providing end around connections between the last and first columns as well as the last and first rows the requirement for shifting controls can be reduced. That is, if the end around connection is provided between the last column and the first column only the right (or the left) shift control line is required since shifts in the left (or the right) direction can be accomplished by a plurality of shifts to the right (or left). The same in a similar manner the up (or down) shift control line could be eliminated.

The array of FIG. 2 additionally has the capability of rolling all columns or selective columns vertically by either up shifting, down shifting, or both. In order to provide this capability the selected column latches 220, 221, 222, 223, 224 or 225 are set by the column bit line inputs from the normal bus register that would be resident within the array rather than the column latch word select line 213 as previously described. Only the selected column latches are set and therefore the up or down shift lines for the selected columns (word field) would be energized through the gates associated with and controlled by the column select latches. That is, if word line 2 (word field) information contained in cells 22 and 23 is to be shifted down to cells 32 and 33, respectively, latch 202 is set, thereby allowing the shift in signal to be gated from line 204 through FET 211 onto the word pulse line 110. The word pulse line 110 is connected to the transfer gate of FIG. 1.

For a word line 2 (word field cells 22 and 23 shifted down) column bit lines for column latches 222, 223, 224 and 225 would be energized via their column bit lines and the associated two way "and" logic enabling a shift down via line 123 for only cells 22 and 23 and not word field (cell 21). The result is that word 2 contains the original information of word 2 in cells 21, 22 and 23 nondestructive read out and word 3 contains the information of 31, 22, and 23 in cells 31, 32, and 33, respectively.

While the invention has been particularly shown and described with reference to the preferred embodiment thereof, it will be understood by those skilled in the art that various changes in form and details may be made therein without departing from the spirit and scope of the invention.

We claim:

1. In a content addressable storage array having a plurality of semiconductor data storage cells arranged in word groups and having means for operating the array to transfer data between selected word groups and an input/output register means, the combination with at least certain of the cell word groups comprising:

a plurality of transfer gates arranged in word groups corresponding to the cell word groups, each of said transfer gates having inputs connected directly to outputs of a respective cell and each having outputs connected directly to inputs of a plurality of cells adjacent its respective cell for transferring data directly between its respective cell and said plurality of adjacent cells, a group of control signal lines for each word group of gates, each group of lines adapted to receive control signals for transferring data directly from the cells of one of said certain cell word groups to the gates of its respective gate word group and from the latter gates to the adjacent cells of a desired one of said certain cell word groups, whereby data in cell word groups can be transferred simultaneously to adjacent cell word groups or alternately shifted right or left.

2. The apparatus of claim 1 wherein said transfer gates each contain a transient storage means for temporarily storing data being transferred between adjacent cells.

3. The apparatus of claim 2 wherein said control signal lines comprise:

a shift in means to control the transfer of said data between the cells of one of said certain groups and the transient storage means of their respective transfer gates, and shifting out means to control the transfer of said data between the latter transient storage means of said transfer gates and adjacent cells of the desired cell word group.

4. The apparatus of claim 3 further comprising means to shift selective columns of said certain groups.

5. The apparatus of claim 4 wherein the output of said transfer gates is connected to each word cell adjacent to the cell to which the input of said transfer gates is connected.

6. The apparatus of claim 5 wherein each cell of the last of said word groups is connected to the corresponding cell of the first of said word groups by a plurality of said transfer gates.

* * * * *